(12) United States Patent
Ouyang et al.

(10) Patent No.: US 12,712,934 B2
(45) Date of Patent: Aug. 18, 2026

(54) INTELLIGENT CONTENT CONTROL FOR CONNECTING TO MULTIPLE SOURCES

(71) Applicant: Google LLC, Mountain View, CA (US)

(72) Inventors: Xuemei Ouyang, Redwood City, CA (US); Michael Scot Pate, Pleasanton, CA (US); Ethan Grabau, London (GB); Dennis Yee, San Francisco, CA (US); Daniel Fernandes Barros, Oporto (PT); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/710,016

(22) PCT Filed: Nov. 23, 2022

(86) PCT No.: PCT/US2022/080413

§ 371 (c)(1),
(2) Date: May 14, 2024

(87) PCT Pub. No.: WO2023/097264

PCT Pub. Date: Jun. 1, 2023

(65) Prior Publication Data

US 2025/0016216 A1 Jan. 9, 2025

Related U.S. Application Data

(60) Provisional application No. 63/282,340, filed on Nov. 23, 2021.

(51) Int. Cl.
*H04L 65/70* (2022.01)
*H04L 65/613* (2022.01)

(52) U.S. Cl.
CPC ............ *H04L 65/613* (2022.05); *H04L 65/70* (2022.05)

(58) Field of Classification Search
CPC ..................................................... H04L 65/613
See application file for complete search history.

(56) References Cited

U.S. PATENT DOCUMENTS

| | | | | |
|---|---|---|---|---|
| 11,533,531 | B1 | 12/2022 | Link | |
| 2013/0091297 | A1* | 4/2013 | Minder | H04N 21/4384 709/231 |

(Continued)

FOREIGN PATENT DOCUMENTS

| | | |
|---|---|---|
| CN | 114697939 | 7/2022 |
| EP | 2537340 | 12/2012 |

(Continued)

OTHER PUBLICATIONS

"International Preliminary Report on Patentability", Application No. PCT/US2022/080413, May 2, 2024, 12 pages.

(Continued)

*Primary Examiner* — Chris Parry
(74) *Attorney, Agent, or Firm* — Colby Nipper PLLC

(57) ABSTRACT

This document describes an accessory that may wirelessly connect to one or more host devices such that the accessory is able to receive content from two or more of the host devices at the same or substantially the same time. When each of the host devices is wirelessly coupled to the accessory, the accessory and each host device may determine a bit rate for the accessory to receive content from each host device. The accessory may receive content from a first host device at a first bit rate. Based on the content received, the accessory may determine a new bit rate for other host devices.

20 Claims, 7 Drawing Sheets

(56) References Cited

U.S. PATENT DOCUMENTS

| | | | | |
|---|---|---|---|---|
| 2018/0081619 | A1* | 3/2018 | Peters | H04N 21/2402 |
| 2020/0152234 | A1* | 5/2020 | Sharma | G11B 20/00086 |
| 2022/0103948 | A1* | 3/2022 | Kumar | H04L 65/765 |
| 2022/0272413 | A1* | 8/2022 | Hallmarker | H04N 21/44209 |

FOREIGN PATENT DOCUMENTS

| | | | | |
|---|---|---|---|---|
| EP | 2537340 | B1 * | 12/2016 | H04L 65/65 |
| EP | 3890375 | | 10/2021 | |
| WO | 2020239985 | A1 | 12/2020 | |
| WO | 2023097264 | | 6/2023 | |

OTHER PUBLICATIONS

"International Search Report and Written Opinion", Application No. PCT/US2022/080413, Mar. 7, 2023, 15 pages.

"Foreign Office Action", EP Application No. 22840521.3, Nov. 21, 2025, 10 pages.

* cited by examiner

Accessory 310
Bit Rates 350
B1
B2
340
342
First Host Device 320
Second Host Device 330

Accessory 410
Bit Rates 450
B1
B2
452
440
440a
442
442a
First Host Device 420
Second Host Device 430

Accessory 410
Bit Rates 450
B1
B2
452a
440
442
First Host Device 420
Second Host Device 430

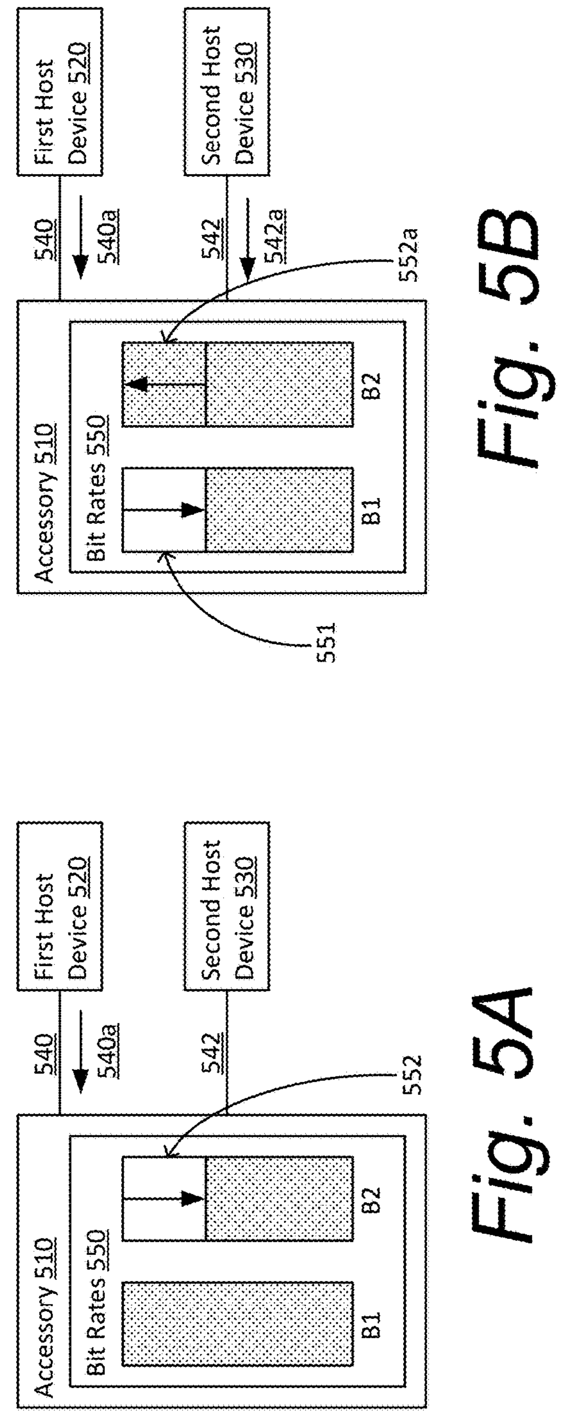
Fig. 5B
Fig. 5A
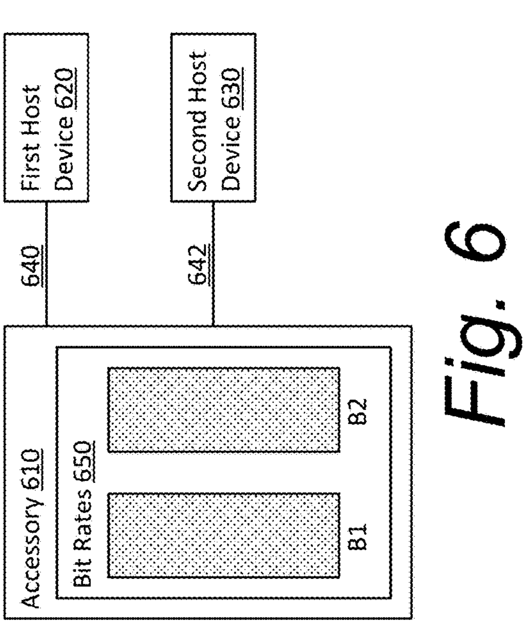
Fig. 6

INTELLIGENT CONTENT CONTROL FOR CONNECTING TO MULTIPLE SOURCES

RELATED APPLICATION(S)

This application is a national stage entry of International Application No. PCT/US2022/080413, filed Nov. 23, 2022, which claims the benefit of U.S. Provisional Application No. 63/282,340, filed Nov. 23, 2021, the disclosures of which are incorporated herein by reference in their entirety.

BACKGROUND

Accessories, such as earbuds and AR/VR headsets, may be wirelessly connected to multiple host devices, such as a laptop, smartphone, tablet, hub, etc. For example, a user may be wearing their earbuds to participate in a conference call streamed from their laptop. At the same time, a notification may come through from their smartphone. The earbuds may only be capable of playing audio from a single host device, even when connected to multiple devices. Therefore, the notification from the smartphone may pause, or interrupt, the audio from the conference call.

SUMMARY

The technology generally relates to an accessory that may wirelessly connect to one or more host devices such that the accessory is able to receive content from two or more of the host devices at the same or substantially the same time. When each of the host devices is wirelessly coupled to the accessory, the accessory and each host device may determine a bit rate for the accessory to receive content from each host device. The accessory may receive content from a first host device at a first bit rate. Based on the content received, the accessory may determine a new bit rate for other host devices.

One aspect of this disclosure includes a method, comprising determining a first bit rate for receiving a first content from a first host device, the first bit rate being at or below a threshold bit rate, determining a second bit rate for receiving a second content from a second host device, the second bit rate being at or below the threshold bit rate, determining, based on receiving the first content from the first host device using the first bit rate, a third bit rate for receiving the second content from the second host device, the third bit rate being less than the second bit rate, and providing the first content.

In some examples, the first content is audio content, and providing the first content comprises output of the audio content by a speaker to a user. The method may further comprise receiving a second content from the second host device using the third bit rate, and providing the second content. The method may stipulate that the first and second bit rates are both determined to be the threshold bit rate, that the first and third bit rates added together equal a second threshold bit rate greater than the first bit rate, and the method may further comprise updating, based on the first content no longer being provided, the bit rate for receiving the second content from the second host device from the third bit rate to the second bit rate.

The method may determine, based on receiving the second content from the second host device at the second bit rate, instead of the third bit rate, a fourth bit rate for receiving the first content from the first host device, the fourth bit rate being less than the first bit rate, and provide the second content at the second bit rate. In some examples, the first and second host devices may be unicast devices. In other examples, the first host device may be a unicast device and the second host device may be a broadcast device.

Another aspect of the disclosure includes an electronic accessory, comprising a wireless communication interface configured to receive content from one or more host devices, a memory, and one or more processors configured to execute the method.

Yet another aspect of the disclosure includes a non-transitory computer readable memory storing instructions, which when executed by one or more processors cause the processors to execute the method.

This Summary is provided to introduce simplified concepts for intelligent content control for connecting to multiple sources, which is further described below in the Detailed Description and is illustrated in the Drawings. This Summary is intended neither to identify essential features of the claimed subject matter nor for use in determining the scope of the claimed subject matter.

BRIEF DESCRIPTION OF THE DRAWINGS

The details of one or more aspects of intelligent content control for connecting to multiple sources are described in this document with reference to the following drawings:

FIGS. 5A-5B are pictorial diagrams illustrating another example use case according to aspects of the disclosure.

FIG. 6 is a pictorial diagram illustrating another example use case according to aspects of the disclosure.

The use of same numbers in different instances may indicate similar features or components.

DETAILED DESCRIPTION

Figure 1:
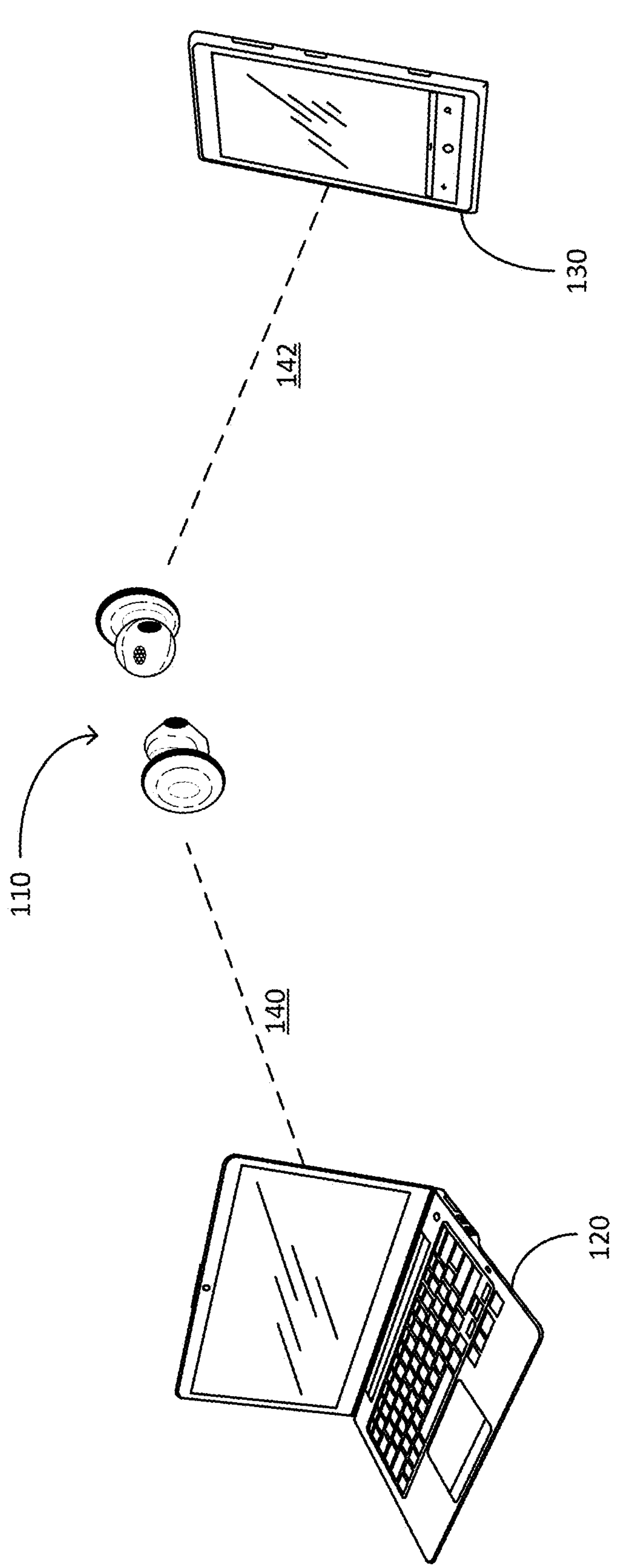
FIG. 1 is a functional diagram of an example system according to aspects of the disclosure.

The technology relates generally to an accessory that may be wirelessly connected to one or more host devices such that the accessory is able to receive content from two or more of the host devices at a same or substantially a same time. An accessory may be used to refer to any electronic device that is coupled to a host device and capable of providing information in some form, such as audio, visual, and haptic feedback to a user. Examples of accessories may include earbuds, smartwatches, headsets, hearing aids, and other wearable or mobile electronics. Host devices include a smartphone, laptop, hub, tablet, gaming console, and home assistant device, to name just a few possible hosts.

The accessory and each of the host devices may include a wireless communications interface such that the accessory can wirelessly connect to each of the host devices. The wireless communications interface may be, for example, an antenna, transceiver, and any other devices used for wireless communication. According to some examples, the antenna may be a short-range wireless network antenna. The antenna may be used to transmit and receive Bluetooth signals between the accessory and each of the host devices.

Each time the accessory wirelessly connects to a host device, a bit rate can be determined. The bit rate is the rate at which content or information is exchanged between the accessory and the host device. The content may be any audible and/or visual media, such as video, images, music content, a short notification, a ringtone notification, audio associated with visual content, etc. Audible media, such as audio content, may be continual audio content having at least a predetermined number of bits for transmission. Additionally or alternatively, audio content may be continual audio content requiring a predetermined bandwidth to prevent packet loss. A short notification may be, for example, a “ping” or “ding” to direct a user’s attention to the accessory or to alert the user of a notification.

To determine the bit rate, the accessory can send a message (e.g., a proprietary message) to the host device and the host device may set the bit rate for transmitting content to the accessory. The bit rate between the accessory and a host device may change each time the accessory connects to a new host device. In some examples, the bit rate between the accessory and a host device may change based on whether the accessory is receiving content from more than one host device, the type of content being received, whether the host device is a unicast or broadcast device, changing wireless channel conditions, etc. A unicast host device may be a host device that is transmitting content to an accessory being used by a single user. A broadcast host device may be a host device that is transmitting content to one or more accessories being used by one or more users. A change in wireless condition may include, for example, using a bad wireless channel or good wireless channel. A noisy, low-bandwidth, or otherwise insufficient wireless channel may cause the bit rate to decrease whereas a better wireless channel may cause the bit rate to increase. In some examples, a poor wireless channel may be a channel in which a packet cannot be reliably received by the accessory. For example, the signal strength may be too weak for the accessory to pick up correctly. In some examples, a weak signal strength may be caused by the distance between the accessory and the host device. Additionally or alternatively, a poor channel connection may be caused by a low signal to noise ratio in cases where there is interference within the system.

The accessory may receive content from two or more host devices simultaneously. In examples where the accessory is earbuds, the content may be audio content. For example, the earbuds may be receiving audio content in the form of music from a first host device and audio content in the form of a notification from a second host device. In examples where the accessory is an AR/VR headset capable of outputting both audio and/or visual content, the content may be audio and/or visual content. For example, the headset may receive audio and visual content in the form of a video from a first host device and audio content in the form of a ringtone for an incoming call from a second host device. The bit rate, or rate of transmission of content, from each host device to the accessory may be negotiated to provide quality transmission of content to then be provided to the user.

When two or more of the host devices transmit content to the accessory, the bit rate for the transmission of content from each host device to the accessory may be negotiated. For example, the accessory may have a maximum available bit rate. The maximum available bit rate may be split between a first host device and a second host device when each of the host devices are transmitting content to the accessory. The bit rate for each host device may be allocated based on the maximum available bit rate, the type of content, the type of device, etc. For example, a host device transmitting music content may be allocated more bit rate than a host device transmitting a notification. According to some examples, the allocation of the bit rate amount for each of the host devices may be combined to equal the maximum available bit rate.

Additionally or alternatively, the accessory may allocate airtime to the content being transmitted by each of the host devices. The allocated airtime can be proportional or roughly proportional to the bit rate. The maximum total bit rate may be a function of the total available airtime. For example, a host device with a higher bit rate may be allocated more airtime than a host device with a lower bit rate, and the bit rates for both hosts combined may be equal to the maximum total bit rate, which may be a function of the total airtime available.

Unicast Host Device Examples

In examples where both host devices are unicast host devices, the bit rate for each host device may change depending on whether both host devices are transmitting content to the accessory and/or the type of content being transmitted to the accessory. For example, when both host devices are idle, such that neither host device is transmitting content to the accessory, both host devices may negotiate the highest possible bit rate with the accessory. When the first host device begins transmitting content to the accessory, such as audio content in the form of music streaming, the accessory may negotiate with the second host device to lower the bit rate of the second host device. According to some examples, the accessory may negotiate with the second host device such that the bit rate of the second host may change while the bit rate of the first host device remains the same.

The first host device may transmit audio content, such as music, to the accessory. While the first host device is transmitting the audio content, the second host device may transmit a notification. As each of the first and second host devices are transmitting content to the accessory, the first and second host devices and the accessory may negotiate the bit rate for each of the host devices. For example, the first host device may negotiate having and/or maintaining a higher bit rate than the second host device based on the type of content being provided for output. Using a higher bit rate for transmitting audio content, such as music streaming, may increase the quality of audio provided for output to the user as compared to a lower bit rate. Additionally or alternatively, lowering the bit rate for transmitting a notification may decrease the quality of notification audio provided for output to the user. According to some examples, the bit rate may be proportional or roughly proportional to the quality of the content provided for output to the user. By decreasing the bit rate for a host device, additional content may be transmitted to the accessory. It may be advantageous to lower the bit rate for audio content of a notification while maintaining the bit rate for music audio content that is concurrently provided for output. This is because many users are more likely to notice a degradation in output quality of music content, but less likely to notice or care about a degradation in output quality of a notification.

The accessory may allocate airtime for receiving content from the first and second host. The airtime may be allocated based on or as a function of bit rate. For example, a lower bit rate may have less airtime than a higher bit rate. In the example where the first host device is transmitting audio content and the second host device is transmitting a notification, the accessory may allocate more airtime to the audio content transmitted by the first host device as compared to the airtime allocated to the notification transmitted by the second host device, based on the first device transmitting at a higher bit rate than the second device.

Renegotiating the bit rate and/or the allocation of airtime may allow a user to receive content from two or more host devices simultaneously. For example, an accessory may not have enough airtime to provide simultaneous output of a first content from a first host device and a second content form a second host device if both host devices are using a maximum, or threshold, bit rate. By reducing the bit rate, and therefore the airtime, of a second host device while keeping the bit rate of the first host device at the threshold level, there may be enough airtime to allow for providing the content from the second host device and the content from the first host device to be output simultaneously.

Unicast and Broadcast Host Device Examples

In examples where a first host device is a unicast host device and a second host device is a broadcast host device, the bit rate for the unicast host device may change while the bit rate for the broadcast host device remains constant. The bit rate for the unicast host device may change or be negotiated based on the bit rate of the broadcast host device.

For example, the accessory may be a pair of earbuds, the unicast host device may be a smartphone, and the broadcast host device may be a car. The car may be wirelessly connected to earbuds of multiple users while the smartphone may be connected to earbuds of a single user. The car may output audio content, such as the audio associated with a movie playing on the entertainment console, to multiple users. One of the multiple users may receive a notification from their smartphone. Adjusting the bit rate for the car would result in a change in output quality to all users, which would be undesirable, and/or the bit rate for the car may not be able to be negotiated by the earbuds. Therefore, the earbuds may negotiate a new, lower bit rate with the smartphone such that the audio content from the car and the notification content from the smartphone may be provided to the earbuds for output simultaneously.

Example Systems

FIG. 1 illustrates an example system 100 in which the features described herein may be implemented. It should not be considered limiting the scope of the disclosure or usefulness of the features described herein. In this example, system 100 may include an accessory 110 and host devices 120, 130. The accessory may be a pair of wireless earbuds 110 and the host devices may be a laptop computer 120 and smartphone 130. In some examples, the accessory may be an AR/VR headset and the host devices may include a hub and tablet.

Accessory 110 and host devices 120, 130 may each be a personal computing device intended for use having all of the components normally used in connection with a personal computing device, as described herein, including a one or more processors (e.g., a central processing unit (CPU)), memory (e.g., RAM and internal hard drives) storing data and instructions, a display (e.g., a monitor having a screen, a touch-screen, a projector, a television, or other devices such as a smartwatch display that is operable to display information), and user input devices (e.g., a mouse, keyboard, touchscreen or microphone). According to some examples, accessory 110 and host devices 120, 130 may each be a mobile computing device capable of wirelessly exchanging data with a server over a network such as the Internet, or a full-sized personal computing device.

In some examples, host devices 120, 130 may be wirelessly coupled to accessory 110. As shown, host device 120 may be wirelessly coupled to accessory 110 via wireless connection 140 and host device 130 may be wirelessly coupled to accessory 110 via wireless connection 142.

Figure 2:
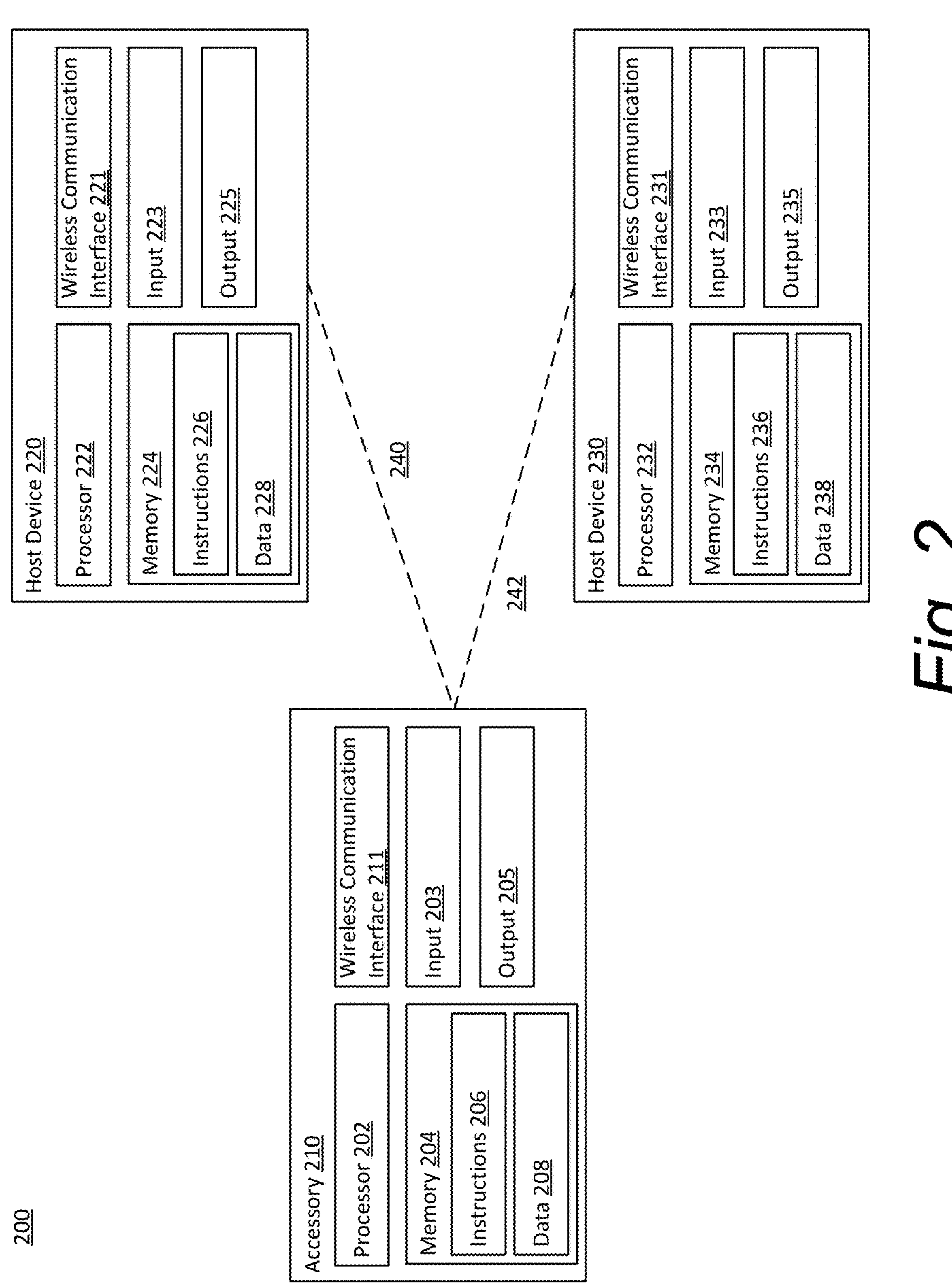
FIG. 2 is a functional block diagram of an example system according to aspects of the disclosure.

FIG. 2 illustrates an example system 200 in which the features described above and herein may be implemented. It should not be considered as limiting the scope of the disclosure or usefulness of the features described herein. In this example, the system 200 may include accessory 210 and host devices 220, 230. Accessory 210 may contain one or more processors 202, memory 204, instructions 206, data 208, a wireless communication interface 211 (such as an antenna), input 203, and output 205. The accessory 210 may be able to communicate with host devices 220, 230 via a short-range wireless communication interface.

The one or more processors 202 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of accessory 210 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of accessory 210. Accordingly, references to a processor or computing device will be understood to include references to a collection of processors or computing devices or memories that may or may not operate in parallel.

Memory 204 may store information that is accessible by the processors, including instructions 206 that may be executed by the processors 202, and data 208. The memory 204 may be any type of memory operative to store information accessible by the processors 202, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 206 and data 208 are stored on different types of media.

Data 208 may be retrieved, stored, or modified by processors 202 in accordance with the instructions 206. For instance, although the present disclosure is not limited by a particular data structure, the data 208 may be stored in computer registers, in a relational database as a table having a plurality of different fields and records, XML documents, or flat files. The data 208 may also be formatted in a computer-readable format such as, but not limited to, binary values, ASCII or Unicode. By further way of example only, the data 208 may be stored as bitmaps comprised of pixels that are stored in compressed or uncompressed, or various image formats (e.g., JPEG), vector-based formats (e.g., SVG), or computer instructions for drawing graphics. Moreover, the data 208 may comprise information sufficient to identify the relevant information, such as numbers, descriptive text, proprietary codes, pointers, references to data stored in other memories (including other network locations), or information that is used by a function to calculate the relevant data.

The instructions 206 can be any set of instructions to be executed directly, such as machine code, or indirectly, such as scripts, by the processor 202. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods, and routines of the instructions are explained in more detail below.

The accessory 210 may further include a wireless communication interface 211, such as an antenna, transceiver, and any other devices used for wireless communication. The antenna may be, for example, a short-range wireless network antenna. The accessory 210 may be able to be coupled with host devices 220, 230 via wireless connections 240, 242, respectively. For instance, the antenna may be used to transmit and receive Bluetooth signals. There may be a maximum distance between accessory 210 and host devices 220, 230 that would allow accessory 210 and host devices 220, 230 to be within range of each other.

Accessory 210 may further include an input 203. The input 203 may be, for example, a touch sensor, dial, button, or other control for receiving a manual command. The input 203 may, in some examples, be a microphone. The accessory 210 may also include an output 205. The output 205 may be, for example, a speaker.

Host devices 220, 230 may each include one or more processors 222, 232, memory 224, 234 storing data 228, 238 and instructions 226, 236, wireless communication interface 221, 231, input 223, 233, and output 225, 235, respectively, that are substantially similar to those described herein with respect to accessory 210.

As each host device 220, 230 is wirelessly coupled to accessory 210, the host devices 220, 230 and accessory 210 may determine a bit rate for each wireless connection. The bit rate may be the rate at which content or information is exchanged between the accessory and a host device. The bit rate between a host device and the accessory may change each time an additional host device is wirelessly coupled to the accessory.

For example, host device 220 may be wirelessly coupled to accessory 210 via wireless connection 240. Accessory 210 may send a proprietary message to host device 220 to determine the bit rate for the wireless connection 240. After host device 220 is wirelessly coupled to accessory 210, host device 230 may wirelessly couple to accessory 210 via wireless connection 242. Accessory 210 may send a proprietary message to host device 230 to determine the bit rate for wireless connection 242. At the same time, or substantially the same time, accessory may send a proprietary message to host device 220 to determine a new bit rate for wireless connection 240. The new bit rate for wireless connection 240 may be less than the original bit rate when accessory 210 and host device 220 were initially connected. The bit rate of wireless connection 240 may decrease based on the determined bit rate for wireless connection 242. For example, accessory 210 may have a maximum bit rate. As each host device 220, 230 wirelessly connects to accessory 210, each host device may be set at the same threshold bit rate, which is equal to or less than the maximum bit rate.

According to some examples, accessory 210 may set each bit rate for each host device 220, 230 at the threshold bit rate that is less than the maximum bit rate, but the combined bit rates for all connected host devices 220, 230 exceeds the maximum bit rate. When only host 220 is providing content, the remaining bit rate available to accessory 210 is less than the threshold bit rate. In this case, accessory 210 may negotiate a bit rate with host 230 such that the total bit rate for all host devices does not exceed the maximum bit rate. If host device 230 subsequently provides content, it would be using the new, lower bit rate negotiated.

According to some examples, the bit rate between the accessory 210 and host devices 220, 230 may change based on whether the accessory is receiving content from more than one host device, the type of connect being received, whether the host device is a unicast or a broadcast device, a change in wireless conditions, etc. While a number of examples are listed out for what may cause the bit rate to change between an accessory and host device, the list is non-exhaustive and, therefore, is not intended to be limiting.

In examples where accessory 210 is receiving content from both host device 220 and host device 230, the bit rate for each wireless connection 240, 242 may change. For example, when host devices 220, 230 initially wirelessly connect to accessory 210, a first bit rate for wireless connection 240 may be determined and a second bit rate for wireless connection 242 may be determined. The first and second bit rate may be equal to a threshold bit rate less than the maximum bit rate available for accessory 210. The threshold bit rate may be more than half the maximum bit rate. Accessory 210 may receive audio content from host device 220 via wireless connection 240 for output to a user via accessory 210. When accessory 210 receives the audio content from host device 220, accessory 210 may determine a third bit rate for receiving and/or outputting an audio content from the second host device 230. According to some examples, the third bit rate may be less than the first bit rate. In some examples, when the type of audio content is a short notification, the decrease in bit rate may decrease the quality of the output for the notification. In some examples, the decrease the quality of the output of a notification may go unnoticed by a user as compared to a decrease in the quality of the output of audio content such as music or audio content associated with a video. The first and third bit rate combined may equal the maximum bit rate In some examples, accessory 210 may be receiving and outputting the audio content from host device 220 and additionally receiving a notification from host device 230. The audio content from host device 220 may be output at the first bit rate and the notification from host device 230 may be output at the third bit rate.

Using a higher bit rate, such as the first bit rate, for outputting audio content, may increase the quality of output to the user as compared to outputting the audio content using a lower bit rate. For example, by maintaining the first bit rate, the user may have a better listening experience as compared to decreasing the first bit rate to a lower bit rate. Additionally or alternatively, lowering the bit rate for a host device that is not transmitting content may not change the user experience as there is no provided content affected by the decreased bit rate. In some examples, lowering the bit rate for transmitting certain content, such as a notification, may decrease the quality of output to the user. Decreasing the quality of output to a user for content such as notifications may go unnoticed by a user as compared to decreasing the quality of output to audio content such as music streaming. By dynamically changing the bit rate for each host device, additional content may be transmitted to and output by the accessory simultaneously.

According to some examples, the accessory 210 may allocate airtime for receiving content from host devices 220, 230. The airtime allocation may be based on the determined bit rate for wireless connections 240, 242. For example, a wireless connection with a lower bit rate may have less airtime as compared to a wireless connection with a larger bit rate. In some examples, the allocated airtime may be proportional to the bit rate or a function of the bit rate. As the bit rate decreases, the airtime needed to transmit the content may decrease. Additionally or alternatively, as the bit rate increases, the airtime needed to transmit the content may increase. By adjusting the bit rate and, therefore, the allocated airtime, for content transmitted from a first host device, there may be bit rate and/or airtime available for content to be transmitted from a second host device.

Example Use Cases

An accessory may be wirelessly connected to one or more host devices. Each of the host devices may transmit content to the accessory for output to the user. In some examples, a single host device may transmit one or more types of content to the accessory simultaneously. For example, an accessory may receive audio content, such as music, from a host device. While the accessory is receiving the music from the host device and outputting the music to the user, the accessory may additionally receive a notification. The notification may be a short notification, such as a short audio clip. In some examples, the notification may be a system notification. The music and the notification may be output to the user simultaneously. For example, the accessory may output the short notification in conjunction with the music such that there is no pause in the music being output to the user. In some examples, the host device may mix, or combine, the contents before transmitting the content to the accessory. Additionally or alternatively, the host device may transmit each content separately such that the accessory mixes, or combines, the content prior to outputting the content.

In some examples, the accessory may receive audio content associated with two or more mono streams from a single host device. For example, a user may be wearing a pair of ear buds and the earbuds may wirelessly connect to a smartphone. The user may be participating in a conference call using the smartphone. Each participant on the conference call may be one of the mono streams. The accessory may receive each of the mono streams to the ear buds for output to the user. In some examples, the mono streams may all be transmitted to the accessory by the smartphone but not mixed on the smartphone. According to some examples, the mono streams may be mixed, or combined, by the accessory for output.

In some examples, an accessory may receive audio content, such as music, from a host device for output to the user. While the accessory is receiving and/or outputting the audio content, the accessory may receive a notification. The notification may be a broadcast notification that is broadcast to multiple users. In some examples, the broadcast notification may be an airport notification, such as an announcement regarding flight arrival and/or departure times. Airport notifications may be broadcast to and, therefore, received by all devices that are capable of receiving broadcast notifications. The broadcast notification may be a mono-broadcast that is transmitted from a broadcaster. A mono-broadcast notification may be a broadcast audio notification that uses mono-encoding. The accessory may continue to receive the audio content from the host device via an advanced audio distribution profile ("A2DP") or Bluetooth low energy ("BLE") connection while simultaneously receiving the broadcast notification. The bit rate for the audio content may decrease based on the bit rate for the broadcast notification. For example, the broadcast notification may have a predetermined bit rate to ensure quality output to all users receiving the broadcast notification. The bit rate of the audio content, therefore, may decrease based on the bit rate required for the broadcast notification. When the broadcast notification is complete, the bit rate for the audio content may increase such that it returns to its original bit rate.

In another example, an accessory may be receiving audio content associated with a phone call from a host device. During the phone call, the accessory may receive a notification from the host device. The notification may be, for example, a system notification. According to some examples, the accessory may receive the audio content associated with the phone call and system notification from the same host device. The audio content and the notification may not be mixed on the host device. In some examples, the audio content and the system notification may be mixed by the accessory for output to the user.

In one example, an accessory may receive audio content associated with a phone call from a host device. During the phone call, the accessory may receive a notification from the host device. The notification may be, for example, a broadcast notification. The accessory may receive and/or output the audio content either via a hands-free profile ("HFP") or a BLE connection while also receiving the notification. The broadcast notification may be a mono-broadcast that is received from a broadcast source. For example, the broadcast notification may be an airport notification and the broadcast source may be an airport broadcaster. The bit rate for the audio content may decrease based on the bit rate for the broadcast notification. When the broadcast notification is complete, the bit rate for the audio content may increase such that it returns to its original bit rate.

In yet another example, an accessory may receive audio content associated with a phone call from a first host device. During the phone call, the accessory may receive a notification from a second host device. The accessory may receive the notification from the first host device at the same time or substantially the same time as the accessory receives the audio content associated with the phone call from the first host device. In some examples, the bit rate for the notification may decrease to maintain the audio quality of the phone call.

In some examples, an accessory may receive audio content associated with a video game from a host device. In such an example, the host device may be a video game console. The accessory may receive the audio content associated with the video game as well as audio content associated with live chats among the user and other players. According to some examples, the accessory may receive the audio content associated with the video game and the audio content associated with the live chat from the video game console as separate audio streams. In some examples, the audio content associated with the video game and the audio content associated with the live chat may be mixed by the accessory for output to the user.

In another example, an accessory may receive audio content, such as music, from a first host device. While the accessory is receiving music from the first host device, the accessory may simultaneously receive a notification from a second host device. In some examples, the bit rate for receiving and/or outputting the music may increase or be maintained at a high bit rate to maintain the quality of the output to the user. Additionally or alternatively, the bit rate for receiving and/or outputting the notification from the second host device may decrease. In some examples, the decrease in bit rate for the notification may decrease proportionally to the increase in the bit rate for the music. In some examples, the bit rate for the notification combined with the bit rate for the audio content, whether the bit rate for the audio content is maintained or increased, may be equal to a maximum bit rate for the accessory.

In some examples, the accessory may be coupled to more than two host devices. For example, the accessory may be coupled to three host devices. The accessory may receive audio content associated with a phone call from a first host device, audio content associated with a public announcement from a second host device, and audio content associated with a notification from a third host device. The audio content associated with a phone call may be received on a HFP or BLE profile. The audio content associated with the public announcement may be a broadcast notification. The accessory may have determined a minimum bit rate for receiving the broadcast notification. The audio content associated with the notification may be a mono unicast notification. The bit rate for receiving the audio content associated with the phone call and the audio content associated with the notification may change based on the predetermined bit rate for receiving the broadcast announcement. In some examples, the bit rate for the audio content associated with the phone call and notification may decrease to provide the necessary bit rate for receiving the audio content associated with the public announcement. In some examples, the bit rate for receiving the audio content associated with the notification may decrease more than the bit rate for receiving the audio content associated with the phone call. This may allow the accessory to receive the broadcast announcement at the required bit rate, which still maintaining a threshold quality for the audio content associated with the phone call.

In some examples, the accessory may, simultaneously, receive music content from a first host device, a first notification from a second host device, and a second notification from a third host device. The music may be received via an A2DP or BLE profile. The first and second notifications may be mono unicast notifications. The accessory may adjust the bit rates for receiving, and outputting, the content received from each of the host devices. For example, to maintain the quality of the music for output, the bit rate for receiving music from the first host device may increase or be maintained at a high level. Additionally or alternatively, as the content from the second and third host devices is a notification, the bit rate for receiving the first and second notifications may decrease. The user may not notice a decrease in the quality of the notification as compared to a decrease in the quality of the music.

In one example, the accessory may, simultaneously, receive music content from a first host device, a notification from a second host device, and a broadcast notification from a third host device. The music may be received via an A2DP or BLE profile. The notification may be a unicast notification and the broadcast notification may be a mono-broadcast notification. The accessory may adjust the bit rates for receiving, and outputting, the content received from each of the host devices. For example, the broadcast notification may have a minimum predetermined bit rate. In view of the bit rate required for receiving the broadcast notification, the accessory may adjust the bit rate for receiving music and the notification. In some examples, to maintain the quality of the music for output to the user, the bit rate for receiving the notification may drop more than the bit rate for receiving the music. Additionally or alternatively, the bit rate for receiving the music may increase while the bit rate for receiving the notification may decrease.

Example Use Cases—Multiple Unicast Host Devices

An accessory may be wirelessly coupled to two or more host devices. According to some examples, each of the two or more host devices may be unicast host devices. A unicast host device may be a host device that is transmitting content to an accessory being used by a single user. When each of the host devices are unicast host devices, the bit rate for each host device may change depending on which host devices are transmitting content to the accessory and/or the type of content being transmitted.

Figures 3, 4A, 4B:
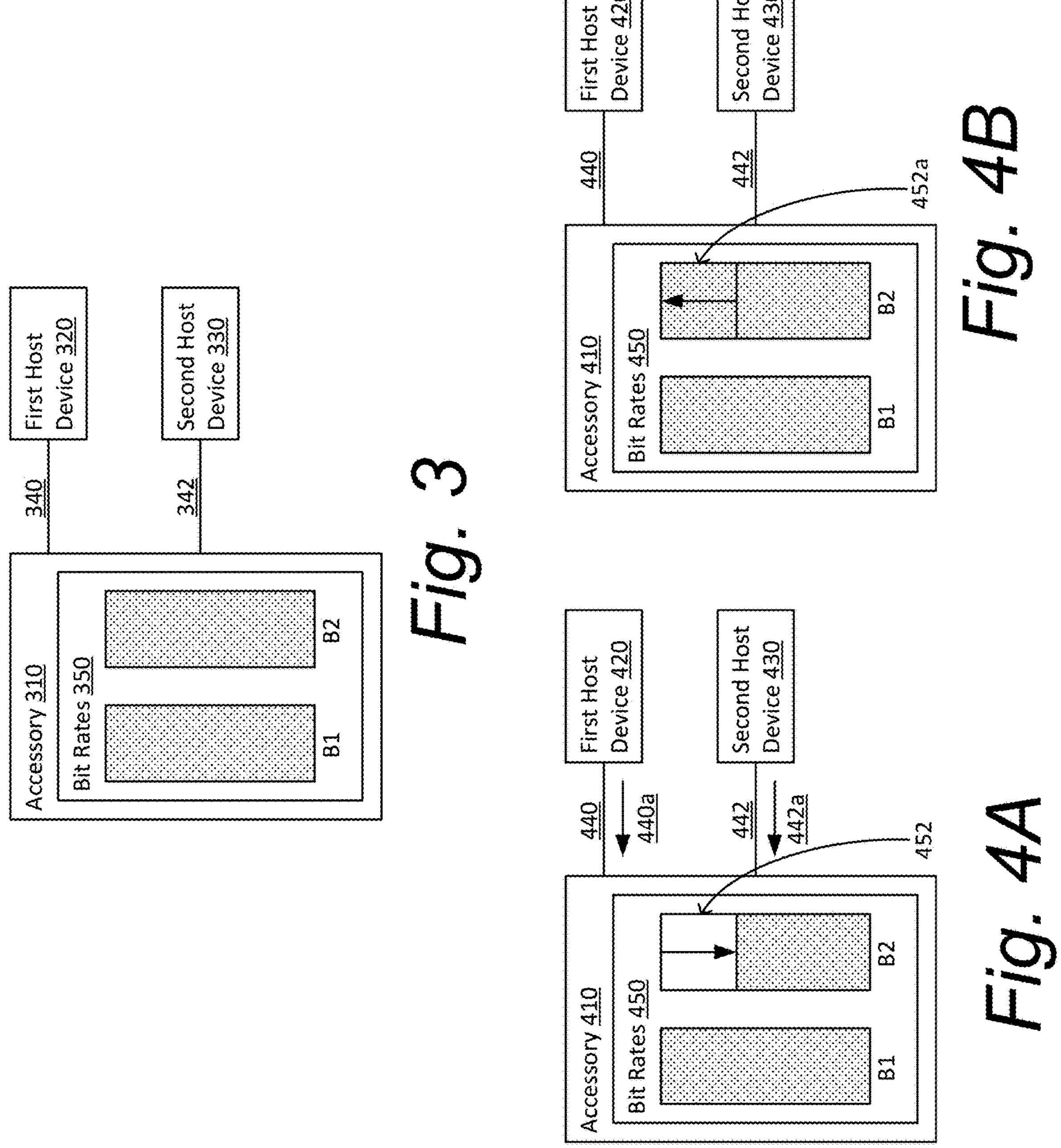
FIG. 3 is a pictorial diagram of an example use case according to aspects of the disclosure.
FIGS. 4A-4B are pictorial diagrams illustrating another example use case according to aspects of the disclosure.

FIG. 3 illustrates an example use case for an accessory wirelessly connected to two unicast host devices. Accessory 310 may be wirelessly coupled to first host device 320 and second host device 330 via wireless connections 340, 342, respectively. At the time first host device 320 and second host device 330 wirelessly connected to accessory 310, first host device 320 and second host device 330 may have negotiated, or determined, the maximum bit rate possible for wireless connections 340, 342. The bit rates are illustrated by bars B1, B2 where B1 corresponds to the bit rate for wireless connection 340 and B2 corresponds to the bit rate for wireless connection 342. The shaded portion of the bars B1, B2 represent the bit rate for wireless connections 340, 342. The bit rates 350, shown at B1, B2, may be the maximum bit rate determined by the accessory 310 and first and second host devices 320, 330 when accessory 310 was initially wirelessly coupled to first and second host devices 320, 330.

FIGS. 4A and 4B illustrate another example use case for an accessory wirelessly connected to two unicast host devices. When accessory 410 is initially wirelessly connected to first host device 420 and second host device 430, wireless connection 440 may have an initial bit rate shown by the bar B1 and wireless connection 442 may have an initial bit rate shown by the bar B2. After first and second host devices 420, 430 are wirelessly coupled to accessory 410, accessory 410 may receive content 440*a* from first host device 420, as shown in FIG. 4A. The content 440*a* may be, for example, audio content, such as music. In some examples, audio content may be continual audio content having at least a predetermined number of bits for transmission. The second host device 430 may remain idle, such that the accessory does not receive content from second host device 430. Based on the type of content and the number of host devices from which the accessory is receiving content, the bit rate for each of the host devices may be renegotiated. Renegotiating the bit rate for each of the host devices may include, for example, the accessory 410 sending a proprietary message to each of the first and second host devices 420, 430 to determine a renegotiated or updated bit rate. The renegotiated bit rate may be different than the bit rate that was determined when the accessory and the host device were first coupled. According to some examples, the bit rates for wireless connections 440, 442 may be negotiated such that the bit rate B1 for wireless connection 440 may be maintained at the maximum level while the bit rate B2 for wireless connection 442 may decrease by amount 452. The bit rate B1 may be maintained at the highest level in order to maintain the quality of the audio content. Additionally or alternatively, the bit rate B2 may decrease as accessory 410 is not receiving content from second host device 430.

According to some examples, bit rate B1 added with bit rate B2, when B2 is decreased by amount 452, may add to a threshold bit rate that may be the maximum total bit rate for device 410. The amount by which bit rate B2 decreases 452 may be determined based on proprietary messages between the accessory 410 and first and second host devices 420, 430.

According to some examples, during the time accessory 410 is receiving content 440*a* from first host device 420, accessory 410 may simultaneously receive content 442*a* from second host device 430. The second content 442*a* may be, for example, a notification. The notification may be a short audio clip, such as a ping or ding, to alert the user. The accessory 410 may receive content 440*a* via wireless connection 440 at bit rate B1 and the content 442*a* via wireless connection 442 may be received at the reduced 452 bit rate B2. That is, the accessory 410 may receive content 440*a* from the first host device 420 at a higher bit rate than the content 442*a* being received by the second host device 430.

In such an example, the airtime for the content 440*a* being received from the first host device 420 may be allocated a first amount of airtime while the content 442*a* being received from the second host device 430 may be allocated a second amount of airtime. By way of example only, the accessory 410 may allocate seventy-five percent (75%) of the airtime to the content 440*a* being transmitted by the first host device 420 and twenty-five percent (25%) of the airtime to the content 442*a* being transmitted by the second host device 430. However, the accessory 410 may allocate any amount of airtime to the content 440*a* being transmitted by the first host device 420 and the remainder to the content 442*a* being transmitted by the second host device 420. According to some examples, the allocated airtime may be determined based on the type of content 440*a*, 442*a* being transmitted, the bit rates B1, B2, the decrease in the second bit rate 452, the channel quality, etc. In some examples, after the second host device 430 stops transmitting content 442*a*, the accessory may allocate all the airtime back to the content 440*a* being transmitted by the first host device 420.

When content 440*a* is no longer being provided over wireless connection 440 from host 420 to device 410, bit rate B2 may be increased by an amount 452*a* to return to the maximum bit rate, as illustrated by FIG. 4B. This allows for any content 440*a*, 442*a* from host devices 420, 430 to be transmitted at the maximum allowable bit rate. By way of example, suppose content 440*a* in FIG. 4A is an audio content, and content 442*a* in FIG. 4A is a notification content. After both contents 440*a*, 442*a* have been provided to accessory 410 and hosts 420, 430 are no longer providing content, accessory 410 negotiates with host 430 to increase bit rate B2 by amount 452*a*, as shown in FIG. 4B. Host 430 may now provide content at the maximum allowable bit rate to accessory 410.

In some examples, host device 420 may cease providing content 440*a* while host device 430 continues to provide content 442*a*. In this case, accessory 410 may renegotiate bit rates 450 such that bit rate B2 is increased to a maximum bit rate while bit rate B1 is reduced to a lower bit rate. In this instance, content 442*a* may continue to be provided at a higher quality than before bit rate B2 was increased.

In some examples, the notification received from second host device 430 may be a notification of an incoming call. For example, instead of a ping or a ding, the notification may be a ringtone. The ringtone may be received at the decreased bit rate B2-452 while the content 440*a* being provided by the first host device 420 continues to be received at the increased bit rate B1, illustrated in FIG. 4A. By lowering 452 the bit rate B2 for receiving the notification, the user may receive the ring tone and the music simultaneously without impacting the output of the music in a way that would be detectable by a human ear. According to some examples, the user may not notice that the quality of the ring tone has decreased due to the decreased bit rate B2-452 as compared to if the quality of the music content decreased due to decreasing the bit rate B1.

In examples where the notification is a ringtone for an incoming call, the user may choose to accept or reject the call. If the user accepts the call, content 440*a* being received from the first host device 420 may be stopped while the phone call proceeds. If the user rejects the call, the accessory 410 may no longer receive content 442*a* from second host device 430. In such an example, the bit rate B1 for wireless connection 440 may not change.

When the accessory 410 stops receiving content 440*a*, 442*a* from both the first and second host devices 420, 430, the bit rates B1, B2, respectively, may return to the first bit rates as shown in FIG. 3.

FIGS. 5A and 5B illustrate another example use case for an accessory wirelessly connected to two unicast host devices. When accessory 510 is initially wirelessly connected to first host device 520 and second host device 530, wireless connection 540 may have a first bit rate shown by the bar B1 and wireless connection 542 may have a first bit rate shown by the bar B2. After first and second host devices 520, 530 are wirelessly coupled to accessory 510, accessory 510 may receive content 540*a* from first host device 520. The bit rate B1 for wireless connection 540 may be maintained while the bit rate B2 for wireless connection 542 may decrease 552

In some examples, accessory 510 may receive content 540*a* in the form of a notification from first host device 520 via wireless connection 540. The bit rate for receipt of this notification 540*a* may be at or near the maximum allowable bit rate. After notification 540*a* begins transmission, host device 530 may provide a second content 542*a* over wireless connection 542 at the bit rate B2-552, as illustrated in FIG. 5B. This second content 542*a* may be music content. It may be determined that the music content 542*a* should be provided at a higher bit rate than the notification content 540*a*. The bit rates 550 for wireless connections 540, 542 may be renegotiated such that the bit rate B1 for host device 520 is decreased by amount 551 and the reduced bit rate B2-552 for host device 530 is increased by amount 552*a*. The amount 552*a* may be the same amount as that for amount 552, increasing the bit rate B2 back to the maximum allowable bit rate. In this way, accessory 510 may provide the music content 542*a* at a higher output quality than notification content 540*a*. This may improve the user's experience with the output of content 542*a* via accessory 510. Decreasing bit rate B1 may not have a noticeable effect on the user's experience as content 540*a* is a notification.

According to some examples, before bit rate B2 increases 552*a* from the decreased B2-552 bit rate, the content 542*a* being transmitted by second host device 530 may be paused. The pause may be as long as it takes for the accessory 510 and first and second host devices 520, 530 to renegotiate the bit rates B1, B2. In some examples, the pause in content 542*a* may be a short enough period of time such that the user does not notice that there was a pause in the content. For example, the pause may be on the order of 1 to 100 or 200 milliseconds.

When accessory 510 stops receiving content 540*a*, 542*a* from both the first and second host devices 520, 530, the bit rates B1, B2, respectively, may return to the initial bit rates 650 shown by the bars B1, B2 in FIG. 6. Host devices 620, 630 may now have the maximum allowable bit rates 650, illustrated by the filled bars B1, B2, for any content to be provided to accessory 610 over wireless connections 640, 642.

Example Use Cases—Mixed Unicast and Broadcast Host Devices

An accessory may be wirelessly coupled to two or more host devices. According to some examples, the host devices may be a combination of unicast host devices and broadcast host devices. As described above and herein, a unicast host device may be a host device that transmits content to an accessory being used by a single user and a broadcast host device may be a host device that transmits content to one or more accessories being used by one or more users. The bit rate for the unicast host devices may change depending on the content being transmitted as well as the number of host devices transmitting content to the accessory. Additionally or alternatively, the bit rate for the broadcast host device may remain constant regardless of the content being transmitted as well as the number of host devices transmitting content to the accessory. In some examples, the bit rate for the unicast host device may change based on the determined bit rate for the broadcast host device.

Figures 7A, 7B:
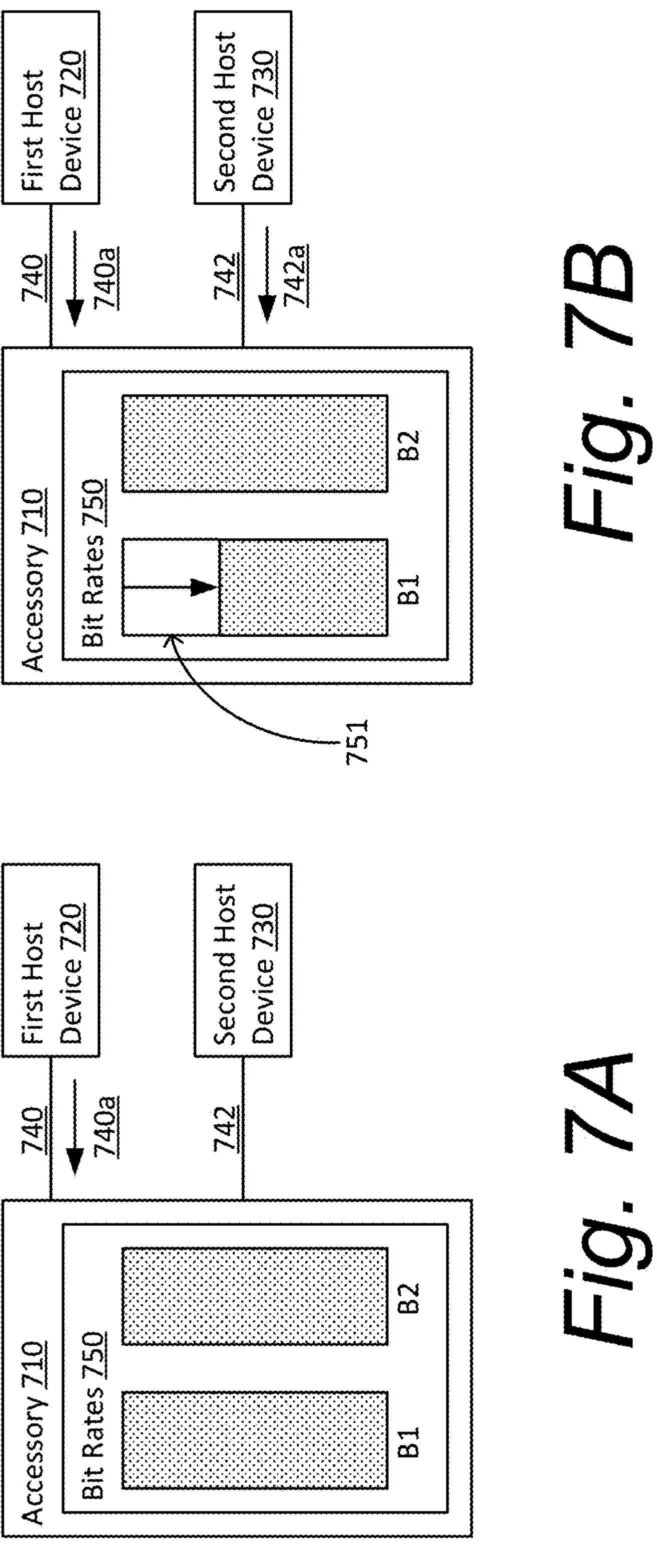
FIGS. 7A-7B are pictorial diagrams illustrating another example use case according to aspects of the disclosure.

FIGS. 7A and 7B illustrate an example use case for an accessory wirelessly connected to a unicast host device 720 and a broadcast host device 730. Accessory 710 may be wirelessly coupled to first host device 720 and second host device 730 via wireless connections 740, 742, respectively. At the time first host device 720 and second host device 730 are wirelessly connected to accessory 710, first host device 720 and second host device 730 may have negotiated, or determined, the maximum (or near maximum) bit rate possible for wireless connections 740, 742. The bit rates 750 are illustrated by bars B1, B2 where B1 corresponds to the bit rate for wireless connection 740 and B2 corresponds to the bit rate for wireless connection 742. The shaded portion of the bars B1, B2 represent the bit rate for wireless connections 740, 742. The bit rates B1, B2 may be the maximum bit rate determined by the accessory 710 and first and second host devices 720, 730 when accessory 710 was initially wirelessly coupled to first and second host devices 720, 730.

According to some examples, the first host device 720 may be a unicast host device and the second host device 730 may be a broadcast host device. The bit rate B2 for the second host device 730 may remain at the bit rate B2 regardless of whether content is being transmitted from second host device 730 to accessory 710 and/or whether content is being transmitted from first host device 720 to accessory 710. In some examples, the bit rate B2 for the second host device 730 may change based on the content being received by the accessory 710 from second host device 730 and/or whether accessory 710 is receiving content 740*a* from first host device 720. Additionally or alternatively, there may be a minimum bit rate B2 for the accessory 710 to receive content from second host device 730. The minimum bit rate B2 may be a predetermined bit rate based on the requirements of the second host device 730.

By way of example only, the accessory 710 may be a pair of earbuds, first host device 720 may be a unicast host device, such as a smartphone, and second host device 730 may be a broadcast host device, such as a car entertainment system. The smartphone 720 may be wirelessly connected 740 to the earbuds of a single user while the car's entertainment system 730 may be wirelessly connected 742 to multiple users. The accessory 710 may receive content 740*a* from the first host device 720 at a first bit rate B1. The first bit rate B1 may be a maximum allowable bit rate, at a threshold bit rate for providing content from a host device to accessory 710. According to some examples, the bit rate B2 for the second host device 930 may not be able to decrease as host 730 is a broadcast host device, and therefore decreasing the bit rate B2 would negatively affect the output quality to other users and/or is not allowed to be decreased by host device 730.

In one example, accessory 710, such as a pair of earbuds, may receive content 740*a*, such as music, from first host device 720, such as a smartphone, as illustrated in FIG. 7A. The music may stream at the highest bit rate negotiated between the pair of earbuds and the smartphone without having renegotiated bit rate B2. The earbuds may receive content 742*a* from the second host device 730, such as a car entertainment system, as illustrated in FIG. 7B. In examples where the earbuds receive the music and the content form the car entertainment system, the music received from the smartphone may pause until the broadcast from the car's entertainment system is completed, pause while a new lower bit rate is determined for streaming the music from the smartphone to the earbuds, and/or automatically adjust the bit rate for streaming the music from the smartphone to the earbuds. The adjustment of bit rate B1 may be to decrease the bit rate by an amount 751, as shown in FIG. 7B. In this way, content 742*a* may be provided to the accessory at the initial bit rate B2 for wireless connection 742.

While a number of example use cases are described above, it should be understood that various other potential use cases exist.

Example Methods

Figure 8:
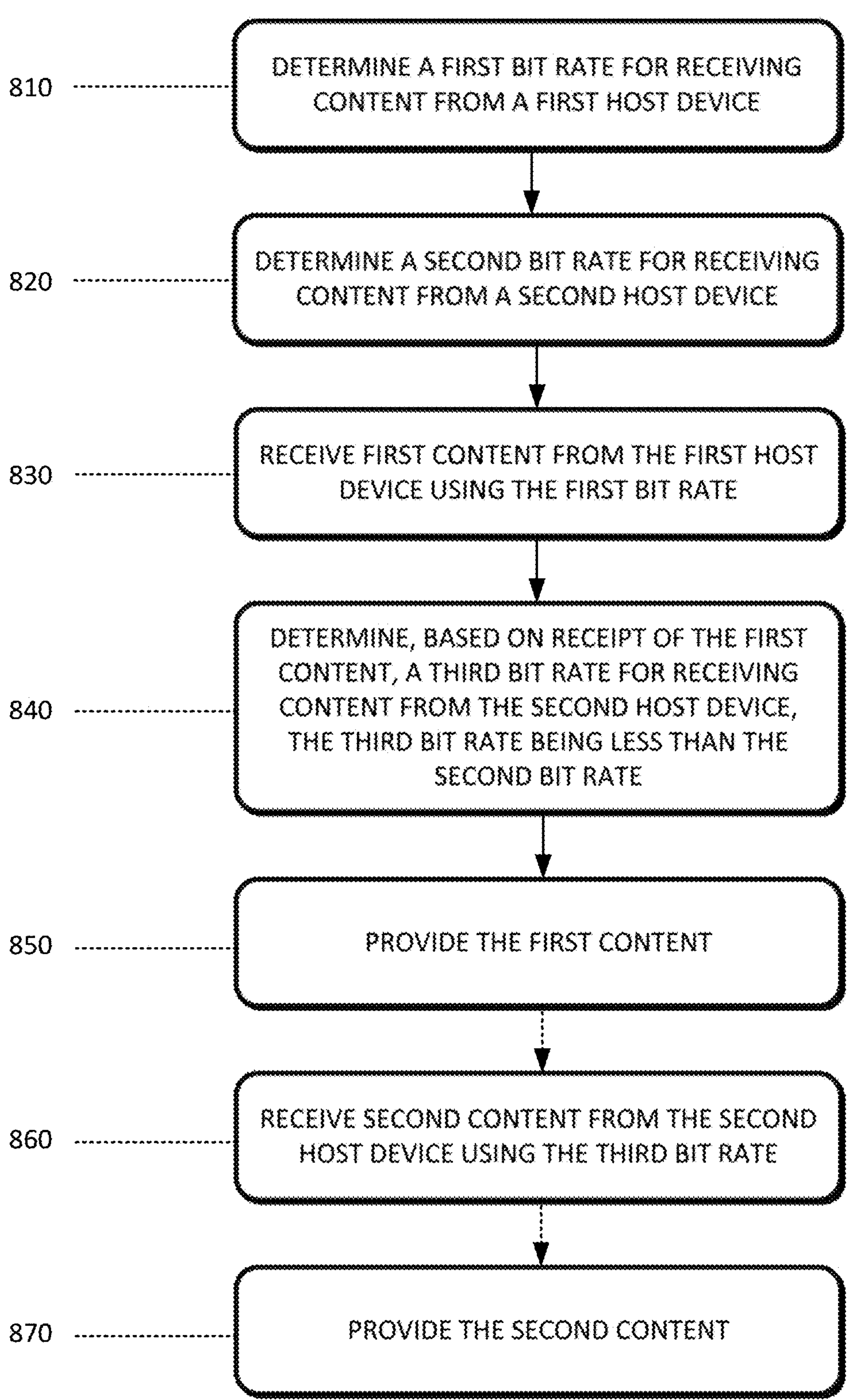
FIG. 8 is a flow diagram illustrating a method of adjusting bit rates for two host devices coupled to an accessory and outputting content according to aspects of the disclosure.

FIG. 8 illustrates an example method for adjusting bit rates of two host devices that are wirelessly coupled to an accessory. The following operations do not have to be performed in the precise order described below. Rather, various operations can be handled in a different order or simultaneously, and operations may be added or omitted.

In block 810, the accessory may determine a bit rate for receiving content from a first host device. For example, the accessory may send a proprietary message to the first host device to determine the first bit rate. The first host device may be, for example, a unicast device. The bit rate may be at or below a threshold bit rate for a single bit rate.

In block 820, the accessory may determine a second bit rate for receiving content from a second host device. For example, the accessory may send a proprietary message to the second host device to determine the second bit rate. The second host device may be, for example, a unicast device. The bit rate may be at or below a threshold bit rate for a single bit rate.

In block 830, the accessory may receive a first content from the first host device using the first bit rate. For example, the accessory may receive audio and/or video content from the first host device for output to a user through a speaker and/or display or other output device.

In block 840, the accessory may determine, based on the first content, a third bit rate less than the second bit rate for receiving a second content from the second host device, the third bit rate being less than the second bit rate. The third bit rate and the first bit rate combined may equal a maximum bit rate for the accessory. For example, if the first content is audio content, the first bit rate may be maintained to ensure the quality of the output to the user. A higher bit rate for audio content, such as music, may provide at least a minimum acceptable sound quality. When the bit rate for the first host device is maintained, the bit rate for the second host device may be decreased Determining the third bit rate may include sending a message to one or both of the first and second host devices. The message may be a proprietary message between the accessory and each of the first and second host devices.

According to some examples, determining the third bit rate includes determining a type of content. A type of content may be, for example, multimedia content such as video, images, music content, a short notification, a ringtone notification, audio associated with visual content, etc.

In block 850, the accessory may provide, based on the first bit rate, the first content, for example to the accessory to be output through the speaker and/or display to a user.

In block 860, the method may additionally or alternatively include receiving second content from the second host device at the third bit rate while simultaneously receiving the first content from the first host device at the first bit rate.

In block 870, the accessory may provide, based on the third bit rate, the second content.

Figure 9:
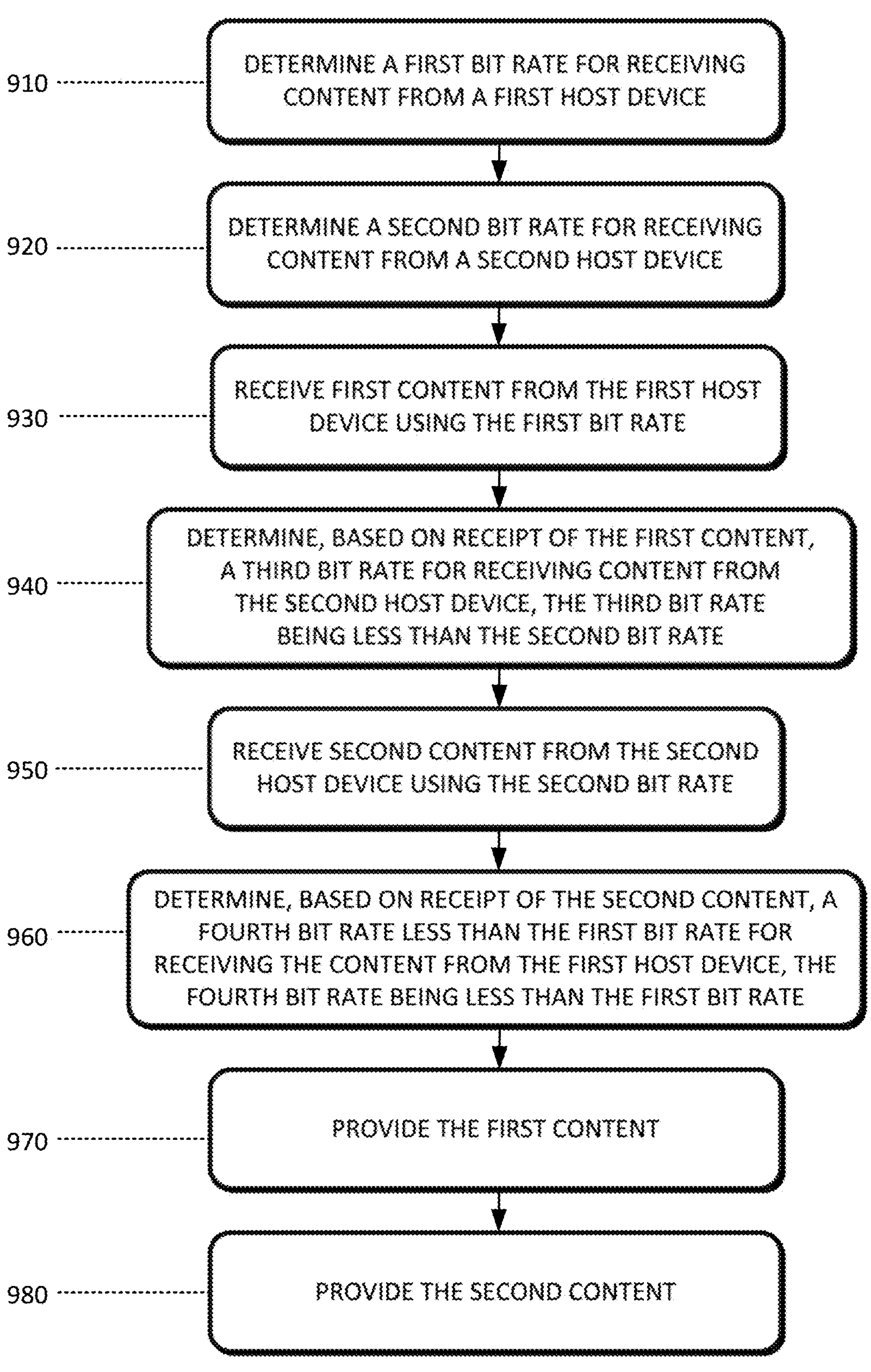
FIG. 9 is a flow diagram illustrating a method of adjusting bit rates for two host devices coupled to an accessory and outputting content according to aspects of the disclosure.

FIG. 9 illustrates an example method for adjusting bit rates of two host devices that are simultaneously transmitting content to an accessory. The following operations do not have to be performed in the precise order described below. Rather, various operations can be handled in a different order or simultaneously, and operations may be added or omitted.

In block 910, the accessory may determine a first bit rate for receiving content from a first host device. The accessory may send a proprietary message to the first host device to determine the first bit rate. The first host device may be a unicast device.

In block 920, the accessory may determine a second bit rate for receiving content from a second host device. The accessory may send a proprietary message to the second host device to determine the second bit rate. The second host device may be a broadcast device.

In block 930, the accessory may receive first content from the first host device using the first bit rate. For example, the accessory may receive audio content from the first host device for output through one or more output devices, such as a speaker or display.

In block 940, the accessory may determine, based on the first content, a third bit rate less than the second bit rate for receiving a second content from the second host device, the third bit rate being less than the second bit rate. The third bit rate and the first bit rate combined may equal a maximum bit rate for the accessory. For example, if the first content is audio content, the first bit rate may be maintained to ensure the quality of the output to the user. A higher bit rate for audio content, such as music, may ensure proper sound quality. When the bit rate for the first host device is maintained, the bit rate for the second host device may be decreased In block 950, the accessory may receive second content from the second host device using the second bit rate due to the second device being a broadcast device and thus being unable to have its bit rate for transmission renegotiated to the third bit rate. For example, the accessory may receive audio content from the second host device for output through the one or more output devices.

In block 960, the accessory may determine, based on the first and second content, a fourth bit rate less than the first bit rate for receiving the content from the first host device, wherein the fourth bit rate and the second bit rate combined may equal a maximum bit rate for the accessory.

In block 970, the accessory may provide, based on the fourth bit rate, the first content.

In block 980, the accessory may provide, based on the second bit rate, the second content.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

Additional Examples

In the following section, examples are provided.

Example 1: An accessory, comprising: a wireless communications interface adapted to receive content from one or more host devices; a memory; and one or more processors in communication with the memory and the communications interface, the one or more processors configured to: determine a first bit rate for receiving content from a first host device; determine a second bit rate for receiving content from a second host device; receive first content from the first host device using the first bit rate; determine, based on the first content, a third bit rate greater than the first bit rate for receiving the first content from the first host device and a fourth bit rate for receiving content from the second host device, wherein the third bit rate and the fourth bit rate combined equal the first and second bit rate combined or less than the first and second bit rate combined; and output, based on the third bit rate, the first content to a user.

Example 2: The accessory of example 1, wherein the one or more processors are further configured to: receive second content from the second host device while simultaneously receiving the first content from the first host device; determine, based on the first and second content and the third bit rate, an updated bit rate for receiving content from each of the first and second host devices; and output, based on the updated bit rates, the first and second content simultaneously to the user.

Example 3: The accessory of example 2, wherein the one or more processors are further configured to allocate, based on the updated bit rates, airtime for the first and second content.

Example 4: The accessory of example 1, wherein determining the third and fourth bit rates includes determining a type of content.

Example 5: The accessory of example 4, wherein the type of content includes at least one of music content, a short notification, a ringtone notification, and audio associated with visual content.

Example 6: The accessory of example 1, wherein the third bit rate is greater than the fourth bit rate.

Example 7: The accessory of example 1, wherein each of the first and second host devices is a unicast device.

Example 8: A method, comprising: determining, by one or more processors, a first bit rate for receiving content from a first host device; determining, by the one or more processors, a second bit rate for receiving content from a second host device; receiving, by the one or more processors, first content from the first host device using the first bit rate; determining, by the one or more processors based on the first content, a third bit rate greater than the first bit rate for receiving the first content from the first host device and a fourth bit rate for receiving content from the second host device, wherein the third bit rate and the fourth bit rate combined equal the first and second bit rate combined or less than the first and second bit rate combined; and outputting, by the one or more processors based on the third bit rate, the first content to a user.

Example 9: The method of example 8, further comprising: receiving, by the one or more processors, second content from the second host device while simultaneously receiving the first content from the first host device; determining, by the one or more processors based on the first and second content and the third bit rate, an updated bit rate for receiving content from each of the first and second host devices; and outputting, by the one or more processors based on the updated bit rates, the first and second content simultaneously to the user.

Example 10: The method of example 9, further comprising allocating, by the one or more processors based on the updated bit rates, airtime for the first and second content.

Example 11: The method of example 8, wherein determining the third and fourth bit rates includes determining, by the one or more processors, a type of content.

Example 12: The method of example 11, wherein the type of content includes at least one of music content, a short notification, a ringtone notification, and audio associated with visual content.

Example 13: The method of example 8, wherein the third bit rate is greater than the fourth bit rate.

Example 14: The method of example 8, wherein each of the first and second host devices is a unicast device.

Example 15: A non-transitory computer-readable medium storing instructions, which when executed by one or more processors, cause the one or more processors to: determine a first bit rate for receiving content from a first host device; determine a second bit rate for receiving content from a second host device; receive first content from the first host device using the first bit rate; determine, based on the first content, a third bit rate greater than the first bit rate for receiving the first content from the first host device and a fourth bit rate for receiving content from the second host device, wherein the third bit rate and the fourth bit rate combined equal the first and second bit rate combined or is less than the first and second bit rate combed; and output, based on the third bit rate, the first content to a user.

Example 16: The non-transitory computer-readable medium of example 15, wherein the one or more processors are further configured to: receive second content from the second host device while simultaneously receiving the first content from the first host device; determine, based on the first and second content and the third bit rate, an updated bit rate for receiving content from each of the first and second host devices; and output, based on the updated bit rates, the first and second content simultaneously to the user.

Example 17: The non-transitory computer-readable medium of example 15, wherein the one or more processors are further configured to allocate, based on the updated bit rates, airtime for the first and second content.

Example 18: The non-transitory computer-readable medium of example 15, wherein determining the third and fourth bit rates includes determining a type of content.

Example 19: The non-transitory computer-readable medium of example 18, wherein the type of content includes at least one of music content, a short notification, a ringtone notification, and audio associated with visual content.

Example 20: The non-transitory computer-readable medium of example 15, wherein the third bit rate is greater than the fourth bit rate.

Example 21: A method, comprising: determining a first bit rate for receiving a first content from a first host device, the first bit rate being at or below a threshold bit rate; determining a second bit rate for receiving a second content from a second host device, the second bit rate being at or below the threshold bit rate; receiving first content from the first host device at the first bit rate; determining, based on the receiving of the first content from the first host device using the first bit rate, a third bit rate for receiving the second content from the second host device, the third bit rate being less than the second bit rate; and providing the first content.

Example 22: The method of Example 21, wherein: the first content is audio content; and providing the first content comprises output of the audio content by a speaker to a user.

Example 23: The method of Example 21, further comprising: receiving a second content from the second host device using the third bit rate; and providing the second content.

Example 24: The method of any one of Examples 21-23, wherein the first and second bit rates are both determined to be the threshold bit rate.

Example 25: The method of any one of Examples 21-24, wherein the first and third bit rates added together equal a second threshold bit rate, the second threshold bit rate being greater than the first bit rate.

Example 26: The method of any one of Examples 21-25, further comprising determining, based on the first content no longer being provided, a restore bit rate for receiving the second content from the second host device, the restore bit rate being equal to the second bit rate.

Example 27: The method of any one of Examples 21-26, wherein the first and second host devices are unicast devices.

Example 28: The method of Example 21, further comprising: receiving the second content from the second host device at the second bit rate; determining, based on receiving the second content from the second host device at the second bit rate, instead of the third bit rate, a fourth bit rate for receiving the first content from the first host device, the fourth bit rate being less than the first bit rate; and providing the second content.

Example 29: The method of Example 28, wherein the first host device is a unicast device and the second host device is a broadcast device.

Example 30: The method of Example 27, wherein the second and fourth bit rates added together equal a second threshold bit rate, the second threshold bit rate being greater than the second bit rate.

Example 31: The method of any one of Examples 21-30, wherein the determining of the first, the second, or the third bit rate includes determining a type of the content.

Example 32: The method of Example 31, wherein the type of content includes at least one of music content, a short notification, a ringtone notification, or audio associated with visual content.

Example 33: The method of any one of Examples 21-32, further comprising determining an airtime for the first or the second content based at least in part on the determined first, second, or third bit rate.

Example 34: An electronic accessory, comprising: a wireless communication interface configured to receive content from one or more host devices; a memory; and one or more processors configured to execute the method of any one of Examples 21-33.

Example 35: A non-transitory computer readable memory storing instructions, which when executed by one or more processors cause the processors to execute any one of the methods of Examples 21-33.

CONCLUSION

Although implementations of devices, methods, and systems directed to intelligent content control for connecting to multiple sources have been described in language specific to features and/or methods, it is to be understood that the subject of the appended claims is not necessarily limited to the specific features or methods described. Rather, the specific features and methods are disclosed as example implementations of devices, methods, and systems directed to reducing the occlusion effect.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

The invention claimed is:

1. A method for adjusting bit rates by an electronic accessory, comprising:

determining a first bit rate for receiving a first content from a first host device coupled to the electronic accessory, the first bit rate being at or below a threshold bit rate;

determining a second bit rate for receiving a second content from a second host device wirelessly coupled to the electronic accessory, the second bit rate being at or below the threshold bit rate;

receiving the first content from the first host device using the first bit rate;

determining, based on the receiving of the first content from the first host device using the first bit rate, a third bit rate for receiving the second content from the second host device, the third bit rate being less than the second bit rate, wherein:

the determining of the first, the second, or the third bit rate includes determining a type of the first, second, or third content; and the type of the first, second, or third content includes at least one of a music content, a short notification, a ringtone notification, or an audio associated with visual content; and providing the first content for an output device for visual or audible media.

2. The method of claim 1, wherein:

the first content is an audio content; and providing the first content comprises output of the audio content by a speaker.

3. The method of claim 1, further comprising:

receiving the second content from the second host device using the third bit rate; and providing the second content for the output device.

4. The method of claim 1, wherein the first and second bit rates are both determined to be the threshold bit rate.

5. The method of claim 1, wherein the first and third bit rates added together equal a second threshold bit rate, the second threshold bit rate being greater than the first bit rate.

6. The method of claim 1, further comprising determining, based on the first content no longer being provided, a restore bit rate for receiving the second content from the second host device, the restore bit rate being equal to the second bit rate.

7. The method of claim 1, wherein the first and second host devices are unicast devices.

8. The method of claim 1, further comprising:

receiving the second content from the second host device at the second bit rate;

determining, based on receiving the second content from the second host device at the second bit rate, instead of the third bit rate, a fourth bit rate for receiving the first content from the first host device, the fourth bit rate being less than the first bit rate; and providing the second content.

9. The method of claim 8, wherein the second and fourth bit rates added together equal a second threshold bit rate, the second threshold bit rate being greater than the second bit rate.

10. The method of claim 1, further comprising determining an airtime for the first or the second content based at least in part on the determined first, second, or third bit rate.

11. The method of claim 1, wherein the output device is the electronic accessory.

12. An electronic accessory, comprising:

a wireless communication interface configured to receive content from one or more host devices;

one or more processors; and a memory storing instructions that, when accessed by the one or more processors, cause the one or more processors to:

determine a first bit rate for receiving a first content from a first host device over the wireless communication interface, the first bit rate being at or below a threshold bit rate;

determine a second bit rate for receiving a second content from a second host device over the wireless communication interface, the second bit rate being at or below the threshold bit rate;

receive the first content from the first host device using the first bit rate;

determine, based on the receiving of the first content from the first host device using the first bit rate, a third bit rate for receiving the second content from the second host device, the third bit rate being less than the second bit rate;

determine an airtime for the first or the second content based at least in part on the determined first, second, or third bit rate; and provide, based on the determined airtime, the first content for an output device for visual or audible media.

13. The electronic accessory of claim 12, wherein the determining of the first, the second, or the third bit rate includes determining a type of the content.

14. The electronic accessory of claim 12, wherein the output device is the electronic accessory.

15. The electronic accessory of claim 12, wherein the instructions further cause the one or more processors to:
receive the second content from the second host device using the third bit rate; and
provide the second content for the output device.

16. The electronic accessory of claim 12, wherein the first and second bit rates are both determined to be the threshold bit rate.

17. A non-transitory computer readable memory storing instructions, which when executed by one or more processors of an electronic accessory cause the one or more processors to:
determine a first bit rate for receiving a first content from a first host device wirelessly coupled to the electronic accessory, the first bit rate being at or below a threshold bit rate;
determine a second bit rate for receiving a second content from a second host device wirelessly coupled to the electronic accessory, the second bit rate being at or below the threshold bit rate;
receive the first content from the first host device using the first bit rate;
determine, based on the receiving of the first content from the first host device using the first bit rate, a third bit rate for receiving the second content from the second host device, the third bit rate being less than the second bit rate;
determine an airtime for the first or the second content based at least in part on the determined first, second, or third bit rate; and
provide, based on the determined airtime, the first content for an output device for visual or audible media.

18. The non-transitory computer readable memory of claim 17, wherein the instructions further cause the one or more processors to:
receive the second content from the second host device using the third bit rate; and
provide the second content for the output device for visual or audible media.

19. The non-transitory computer readable memory of claim 17, wherein the first and second bit rates are both determined to be the threshold bit rate.

20. The non-transitory computer readable memory of claim 17, wherein the first and third bit rates added together equal a second threshold bit rate, the second threshold bit rate being greater than the first bit rate.

* * * * *